3,644,319
AFTERTREATMENT OF VINYLIDENE FLUORIDE POLYMERS PREPARED IN THE PRESENCE OF ALKYLPEROXYDICARBONATE COMPRISING HEAT TREATMENT OF THE POLYMERS WITH WATER

Shigeru Seki and Hisao Sanada, Iwaki-shi, Japan, assignors to Kureha Kagaku Kogyo Kabushiki Kaisha, Tokyo, Japan
No Drawing. Filed Apr. 10, 1968, Ser. No. 720,365
Claims priority, application Japan, Apr. 20, 1967, 42/25,361
Int. Cl. C08f 3/22
U.S. Cl. 260—92.1         4 Claims

ABSTRACT OF THE DISCLOSURE

A vinylidene fluoride polymer obtained by polymerization with the use of organic peroxide as a catalyst is subjected, prior to drying, to a heat treatment at a temperature of from 70 to 120 degrees C. and in the constant presence of water in order to cause decomposition and removal of residual catalyst, whereby the thermal stability of the polymer is greatly improved. The heat treatment can be carried out by indirect heating from outside, by blowing steam into a suspension of the polymer in water, or by fluidized treatment of the polymer with steam.

BACKGROUND OF THE INVENTION

This invention relates generally to the field of polymers and production thereof and more particularly to improvement in aftertreatment of vinylidene fluoride polymers. More specifically, the invention concerns a new and improved aftertreatment process wherein vinylidene fluoride polymers are aftertreated at readily attainable temperatures in the presence of water or water vapour thereby to produce vinylidene fluoride polymers having high thermal stability.

As is known, it is possible to produce vinylidene fluoride polymers having relatively high thermal stability by polymerization of the vinylidene fluoride monomer with the use of an organic peroxides as a polymerization catalyst. Particularly when lower alkylperoxydicarbonates are used as organic peroxide catalysts, the polymerization temperature becomes low, and accordingly, suspension polymerization on an industrial scale becomes feasible. Moreover, the polymers thus produced have higher melting points and higher strength than vinylidene fluoride polymers produced by conventional emulsion polymerization at temperature above 100 degrees C.

Because of the high melting points of these vinylidene fluoride polymers, their moulding temperatures are also high, being ordinarily from 220 to 270 degrees C. Accordingly, these polymers are required to have thermal stability at even higher temperatures.

We have found that, when polymerization was carried out with the use of lower alkylperoxydicarbonates as catalysts, there were some instances wherein the resulting polymers had insufficient thermal stability at their moulding temperatures and underwent thermal decomposition during moulding whereby their original milky white colour was lost, and only moulded articles of yellowish brown or brown colour could be obtained.

Among the measures for stabilising vinylidene fluoride polymers, there is the method of using stabilizers such as water-soluble salts of barium and strontium thereby to improve the thermal stability, but this method is not very effective in cases where the stability of the starting material vinylidene fluoride polymer itself is low. Furthermore, these stabilizers are generally not desirable for use in chemical devices in which formed structures of vinylidene fluoride polymers of high purity are required or for use in places where electrical resistance is required.

As one result of our research on increasing the thermal stability of vinylidene fluoride polymers, we have found that the catalyst remaining in the polymer has an important influence on the thermal stability of that polymer.

More specifically, we have found that, while polymers prepared by polymerization of vinylidene fluoride are subjected, according to normal practice, to water washing, removal of surplus water, and drying, whereupon the desired products are obtained, great differences in the final thermal stabilities of these products arise depending on factors such as the drying temperature and drying time. We have found that, in general, in order to improve the stability of a polymer, it is necessary to dry the polymer at a low temperature for a long period of time.

Drying under these conditions, however, imposes a restriction on the use of high-efficiency dryers such as a flash dryers and fluidized bed drying equipments whereby the drying cost becomes high. Moreover, the thermal stability of a polymer produced after drying in even this manner is not necessarily fully satisfactory in all cases.

The reason for this appears to be the occurrence of adverse effects such as the formation of aldehydes and other products due to the decomposition during drying of the catalyst occluded within the vinylidene fluoride polymer at the completion of polymerization, which aldehydes and other products remain within the polymer and impart a deleterious effect on the thermal stability of the polymer, or the strong oxidation action of the residual catalyst which acts on the polymer during drying and causes a change or deterioration in the characteristics of the polymer.

In view of these observations, we have carried out research on measures for extracting the residual catalyst in its still undecomposed state such as extraction by means of various solvents which ordinarily can be considered to be suitable for chemical decomposition of the residual catalyst by means of various reducing agents and other agents. However, while there were some measures which exhibited some effectiveness, they were accompanied by various features which are disadvantageous from an industrial viewpoint, and an advantageous method could not be obtained.

On the other hand, however, we have succeeded by the very simple method of heat treating the vinylidene fluoride polymer, prior to drying, in the presence of water (ordinarily of a quantity of more than 50 percent of all other materials) at a very readily attainable temperature of from 70 to 120 degrees C., in rapidly decomposing and removing the catalyst remaining in the polymer and in producing a polymer of very high thermal stability which does not decompose even at high temperatures of from 250 to 270 degrees C. without the use of any stabilizer whatsoever.

SUMMARY OF THE INVENTION

It is an object of the present invention to produce vinylidene fluoride polymers of high thermal stability.

Another object of the invention is to provide a simple and low-cost process for aftertreatment of vinylidene fluoride polymers whereby, and without the use of any stabilizer, these polymers are caused to possess high thermal stabilities.

According to the present invention, briefly summarised, there is provided a process for aftertreatment of vinylidene fluoride polymers polymerised through the use of organic peroxides as catalysts, which process is characterised by the step of heat treating each of the polymers thus polymerised at a temperature of from 70 to 120 degrees C. in the constant presence of water prior to drying of the polymer thereby to cause decomposition and removal of residual catalyst and other impurities and thereby to increase the thermal stability of the polymer.

The nature, details, and utility of the invention will be more clearly apparent from the following detailed description beginning with a consideration of general aspects of the invention and concluding with specific examples of preferred embodiment thereof.

DETAILED DESCRIPTION

As mentioned hereinabove, the heat treatment of the invention is carried out at a readily attainable temperature of from 70 to 120 degrees C. We have found that treatment at a temperature below 70 degrees C. is undesirable since, the rate of decomposition of the residual catalyst is slow, and the decomposition products remain in large quantity in the polymer, while treatment at a temperature above 120 degrees C. gives rise to the possibility of the catalyst imparting a deleterious effect during its decomposition on the polymer whereby the thermal stability thereof is impaired.

While it is possible, as one method of heating the polymer in the presence of water, to suspend the polymer in water and to heat the polymer indirectly from the outside, it is preferable to carry out heat treatment by bubbling steam at a high temperature into the suspension in order to cause rapid decomposition and removal of the residual catalyst within the polymer. Furthermore, by accomplishing hot-water treatment in this manner, it is possible at the same time to cause the water-soluble substances such as alcohols and aldehydes formed as a result of the decomposition of the catalyst (the principal products of decomposition of lower dialkylperoxycarbonates being, as is known, water-soluble in lower alcohols and lower aldehydes) to migrate into the water layers thereby to lower the concentration of the products of decomposition within the polymer. Therefore, the possibility of impairment of the stability of the polymer due to the products of decomposition is eliminated.

We have found that, as an alternative method, the heat treatment of the polymer may be accomplished directly with water vapour by a procedure such as that wherein the polymer is caused by water vapour to form a fluidized bed, but, in this case, it is necessary that the temperature be held below 120 degrees C. and that, furthermore, the polymer be continuously washed by condensed water.

We have found further that, while the time duration of this heat treatment varies with the treatment temperature, this time ordinarily should be over 30 minutes, most preferably over one hour up to 15 hours. When this treatment time is excessively short, the decomposition of the residual catalyst and the migration of the decomposition products into the water layers become insufficient. On the other hand, excessive treatment time is not desirable principally on the point of production cycle.

A prime and imperative requirement of the heat treatment according to the invention is that it be carried out prior to drying of the polymer upon completion of its preparation by polymerization. That is, when vinylidene fluoride polymers in powder form which have been once dried are heat treated in water, their thermal stabilities are not improved to a great extent in most cases. This appears to be a remarkable phenomenon, but the probable reason for this is that the polymer during drying is subjected to effects due to the catalyst and/or its deformation products in the absence of water and changes in its characteristics to become an unstable polymer, whereby its stability cannot be improved by any subsequent removal of the residual catalyst and/or solvent.

An advantageous feature of the present invention is that, since the polymer heat treated in accordance therewith is thereby already free of residual catalyst and decomposition products thereof, which adversely affect the stability of the product, there is no necessity of giving careful consideration to process variables such as the drying temperature and the drying time, which heretofore were thought to have great influence on the stability of the polymer, and it has become possible, therefore, to carry out drying and other aftertreatment of the polymer without restriction by highly efficient processes.

Another feature of the present invention is that the hot-water treatment or treatment with a fluidized bed due to heating steam in accordance with the invention can be readily and effectively carried out in any of a wide variety of heating vessels such as those made of heat-resistant synthetic resins, stainless steels, and glass and glass-lined vessels. Furthermore, heat-applying methods such as heating from the outside, direct blowing in of steam, and fluidised treatment by steam are all effective in the practice of the invention.

The aftertreatment according to the invention is effective, in general, for vinylidene fluoride polymers which have been polymerized with the use of organic peroxides as catalysts. We have found that this treatment is particularly effective for vinylidene fluoride polymers which have been prepared by polymerization at a temperature below 50 degrees C. with the use of lower alkylperoxydicarbonates such as diethylperoxydicarbonate, di-normal-propylperoxydicarbonate, diisopropylperoxydicarbonate, di - secondary - butylperoxydicarbonate, and di - tertiary-butylperoxydicarbonate.

In order to indicate still more fully the nature and utility of the invention, the following specific examples of embodiment of the invention and results are set forth, it being understood that these examples are presented as illustrative only and that they are not intended to limit the scope of the invention.

EXAMPLE 1

When vinylidene fluoride monomer is polymerized with 1 percent (with respect thereto) of di-n-propylperoxydicarbonate as a polymerization catalyst, the resulting vinylidene fluoride polymer contains 0.750 percent by weight of residual catalyst.

A polymer prepared in this manner was subjected to centrifugal separation to produce a still undried polymer containing approximately 10 percent of water. To this polymer, the same weight of water was added, and separate lots of this polymer with added water were heated respectively at 60, 80, and 100 degrees C., the rates of decomposition of the residual catalyst of each lot being determined at various times after the start of the heating-treatment. The results obtained are indicated in Table 1.

TABLE 1.—RATE OF DECOMPOSITION OF RESIDUAL CATALYST AT DIFFERENT HEATING TEMPERATURES AND TIMES

| Heating time | Heating temperature | | |
|---|---|---|---|
| | 60° C., percent | 80° C., percent | 100° C., percent |
| 0 min | ¹ 0.750 | 0.750 | 0.750 |
| 10 min | | | 0.215 |
| 30 min | | | 0.053 |
| 1 hr | 0.600 | 0.264 | 0.0127 |
| 2 hr | | | 0.00253 |
| 3 hr | 0.408 | 0.0835 | |
| 6 hr | 0.259 | 0.0203 | |
| 13 hr | 0.133 | 0.0038 | |
| 22 hr | 0.0650 | 0.00125 | |

¹ Converted value in terms of residual catalyst contained in dried polymer.

From the results indicated in Table 1, it may be concluded that a heating time of more than 1 hour is necessary at 100 degrees C., and a heating time of more than 6 hours is necessary at 80 degrees C., while at 60 degrees C., more than 22 hours is necessary, which time becomes impractical.

EXAMPLE 2

200 grams (g.) of boiling water and 100 g. of a vinylidene fluoride polymer prepared in the manner set forth in Example 1 were placed in a 1-litre glass vessel, into which steam was then bubbled to raise the interior temperature rapidly up to 97 degrees C. Steam was bubbled continuously into the vessel for 60 minutes to cause the residual catalyst within the polymer to decompose, and then the polymer was washed with water, subjected to suction filtration, and dried at 80 degrees C. for 16 hours.

From the polymer thus obtained, samples each of 35 g. were taken. Each sample was subjected to compression moulding at 220 degrees C. for 4 minutes, and then two samples thus moulded were stacked and, subjected to further compression moulding at 240 degrees C. for 10 minutes. The products thus obtained from the hotwater treated polymer were satisfactory and had a milky white colour as indicated in Table 2, which also indicates the colours of products formed from untreated polymer.

TABLE 2

| Sample | Untreated product [1] | Hot-water treated product |
|---|---|---|
| I | Yellowish brown | Milky white. |
| II | Milky white (slightly yellowish) | Do. |
| III | Lemon yellow | Do. |

[1] Dried at 80° C. for 16 hours.

EXAMPLE 3

A vinylidene fluoride polymer hot-water treated in the manner set forth in Example 2 was divided into two lots, one of which was washed with water, and the other was not washed with water, each lot then being dried at 80 degrees C. for 16 hours. From each lot, 3-g. samples were taken, and each sample was subjected to compression moulding at 260 degrees C. for 10 minutes. The measured values of the volume resistivities of the samples thus moulded are shown in Table 3.

TABLE 3

Volume resistivities

| Sample product: | Volume resistivity (ohm-cm.) |
|---|---|
| Untreated | $0.33 \times 10^{15}$ |
| Hot water treated, not water washed | $0.70 \times 10^{15}$ |
| Hot water treated, water washed | $1.74 \times 10^{15}$ |

In this case, the volume resisitivity has a relationship with the impurities such as the catalyst decomposition products within the vinylidene fluoride polymer and, according, is interrelated also to the thermal stability thereof. It is apparent from the results indicated in Table 3, therefore, that by causing decomposition of the residual catalyst in the vinylidene fluoride polymer, causing the products of decomposition to undergo thorough elution in water layers, and further washing the polymer, an even higher effectiveness or treatment is attained.

EXAMPLE 4

The relationship between thermal stabilities in terms of colour tone after compression moulding of a vinylidene fluoride polymer in the manner set forth in Example 2 and volume resistivities measured as set forth in Example 3 is indicated in Table 4. These results indicate the high effectiveness of the hot-water treatment.

TABLE 4.—COLOUR TONE AND VOLUME RESISTIVITY

| Sample | Colour tone | | Volume resistivity (Ωcm.) | |
|---|---|---|---|---|
| | Untreated | Hot-water treated | Untreated | Hot-water treated |
| I | Lemon yellow | Milky white | $0.41 \times 10^{15}$ | $1.61 \times 10^{15}$ |
| II | do | do | $0.31 \times 10^{15}$ | $1.91 \times 10^{15}$ |

EXAMPLE 5

Samples of a vinylidene fluoride polymer prepared by the procedure set forth in Example 1 were placed respectively in a glass vessel, a stainless-steel (Japan Industrial Standards Designation SUS–27, equivalent to A.I.S.I. Type No. 304) vessel, and a vessel made of a heat-resistant vinyl chloride resin and were treated with hot water in the manner set forth in Example 2 and then dried at 80 degrees C. for 15 hours. The measured values of the volume resistivities of the polymers thus processed are shown in Table 5. These results indicate that each of the vessel materials can be used for a hot-water treatment device.

TABLE 5

Hot-water treatment vessel material and volume resistivity [1]

| Vessel material: | Volume resistivity (ohm.-cm.) |
|---|---|
| Glass | $1.74 \times 10^{15}$ |
| Stainless steel | $1.40 \times 10^{15}$ |
| Vinyl chloride, heat resistant | $1.21 \times 10^{15}$ |

[1] Volume resistivity of an untreated product was $0.31 \times 10^{15}$.

EXAMPLE 6

Samples of a vinylidene fluoride polymer some of which were hot-water treated in accordance with invention, and some of which were not thus treated were washed with water, freed of surplus water, and then dried respectively at different temperatures and for different times as indicated in Table 6. The polymers thus prepared were then compression moulded in the manner specified in Example 2, and the thermal stabilities of the moulded products were compared as indicated also in Table 6.

In Table 6, and also in Table 8 of Example 7 to follow, the standard of evaluation of thermal stability is based on a scale divided into five classifications depending on volume resistivity and respectively designated by characters "A" through "E" as set forth in Table 7.

TABLE 6.—TREATMENT, DRYING CONDITIONS, AND THERMAL STABILITY

| | Drying conditions | | |
|---|---|---|---|
| Treatment | 80° C., 22 hrs. | 80° C., 10 hrs. | 100° C., 3 hrs. |
| Hot-water treated product: | | | |
| Steam bubbled in for 1 hr. into polymer-water slurry | A | A | A |
| Polymer dropped into hot water at 100° C., treated 1 hr | A | | |
| Polymer-water slurry heated slowly over 40 min. up to 100° C., then treated at 100° C. for 1 hr | | B | |
| Untreated product: (polymer water washed, and surplus water removed) | D | E | D |

From the results shown in Table 6, also, a distinct difference between products which have been hot-water treated and those not so treated is observable. Furthermore, it is apparent that raising the temperature as rapidly as possible at the time of hot-water treatment is desirable.

It is also observable that untreated products deviate in thermal stability depending on the drying conditions.

TABLE 7

| Thermal stability designation: | Volume resistivity (ohm. cm.) |
|---|---|
| A | $1 \times 10^{15} - 2 \times 10^{15}$. |
| B | $5 \times 10^{14} - 1 \times 10^{15}$. |
| C | $2 \times 10^{14} - 5 \times 10^{14}$. |
| D | $5 \times 10^{13} - 2 \times 10^{14}$. |
| E | Less than $5 \times 10^{13}$. |

EXAMPLE 7

A vinylidene fluoride polymer produced by the polymerization procedure specified in Example 1 was washed with water, filtered, freed of surplus water, and dried at 80 degrees C. for 22 hours. Different samples of the polymer thus obtained were respectively washed with water, hot water, methyl alcohol, acetone, benzene, and cyclohexane. The thermal stabilities of the polymers thus washed and those of polymers dried after hot-water treatment according to the invention are indicated in Table 8. These results shown in Table 8 indicate the substantially great effect of the hot-water treatment of the invention.

TABLE 8.—EFFECT OF WASHING DRIED POLYMER

| Treatment | Wash liquid | Thermal stability |
|---|---|---|
| Untreated product, dried | | B-D |
| Untreated product, washed after drying | Water | B-D |
| | Hot water | B-C |
| | Methyl alcohol | C-D |
| | Acetone | D-E |
| | Benzene | D |
| | Cyclohexane | D |
| Hot-water treated product, dried | | A |

It should be understood, of course, that the foregoing disclosure relates to only examples of preferred embodiment of the invention and that it is intended to cover all changes and modifications of the examples of the invention herein chosen for the purposes of the disclosure, which do not constitute departures from the spirit and scope of the invention as set forth in the appended claims.

We claim:

1. An aftertreatment process for obtaining homopolymers of vinylidene fluoride of high thermal stability, wherein the residual catalysts in the homopolymers are decomposed and removed without injuriously effecting the homopolymers, which comprises contacting the homopolymers prepared by homopolymerization of vinylidene fluoride at a temperature below 50° C. inclusive in the presence of at least one lower alkylperoxydicarbonate catalyst selected from the group consisting of diethylperoxydicarbonate, di-normal-propylperoxydicarbonate, diisopropylperoxyldicarbonate and di-secondary-butylperoxyldicarbonate, as a catalyst with water to remove any water-soluble additives existing therein, heating said homopolymers in the presence of water at a temperature of from 70° C. to 120° C. for a period of from 30 minutes to 15 hours to decompose the residual catalyst, said water being present in an amount of more than 50% based on the total weight of the material treated, separating the water, and drying the polymers.

2. The aftertreatment process as claimed in claim 1 in which the polymer is heat treated by suspending the polymer in water in a vessel and heating the suspended polymer indirectly from the outside.

3. The aftertreatment process as claimed in claim 1 in which the polymer is heat treated by forming a suspension of the polymer in water and bubbling steam at a high temperature into said suspension thereby to cause rapid decomposition and removal of the residual catalyst within the polymer.

4. The aftertreatment process according to claim 1, in which the polymer is heat-treated for a period of 1–15 hours.

References Cited

UNITED STATES PATENTS

| | | | |
|---|---|---|---|
| 2,398,926 | 4/1946 | Dorough | 260—92.1 |
| 2,438,480 | 3/1948 | Stanton | 260—92.8 A |
| 2,918,461 | 12/1959 | Flynn | 260—94.9 F |
| 3,413,277 | 11/1968 | Crano et al. | 260—92.1 |
| 3,475,396 | 10/1969 | McCain et al. | 260—92.1 |
| 2,751,375 | 6/1956 | Mantell et al. | 260—92.1 |
| 2,751,376 | 6/1956 | Barnhart et al. | 260—92.1 |
| 3,012,021 | 12/1961 | Hauptschein | 260—92.1 |
| 3,031,437 | 4/1962 | Iserson | 260—92.1 |
| 3,114,742 | 12/1963 | Solvik et al. | 260—94.9 F |
| 3,193,539 | 7/1965 | Hauptschein | 260—92.1 |
| 3,203,943 | 8/1965 | Houser et al. | 260—94.9 F |
| 3,245,971 | 4/1966 | Iserson | 260—92.1 |
| 3,354,135 | 11/1967 | Scarso | 260—92.1 |
| 3,380,980 | 4/1968 | Calkins et al. | 260—86.1 |

HARRY WONG, JR., Primary Examiner